Nov. 28, 1944.  G. L. DALE  2,363,776
SPRAYING APPARATUS
Filed March 30, 1942  2 Sheets-Sheet 1
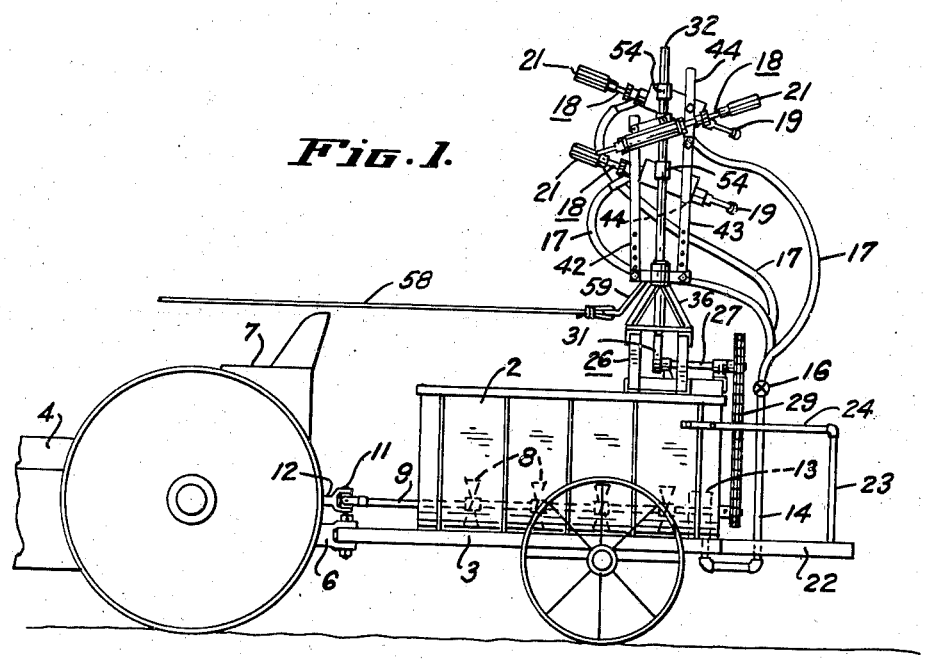
INVENTOR.
GEORGE LESTER DALE
BY Charles M. Fryer
ATTORNEY.

Nov. 28, 1944.   G. L. DALE   2,363,776
SPRAYING APPARATUS
Filed March 30, 1942   2 Sheets-Sheet 2
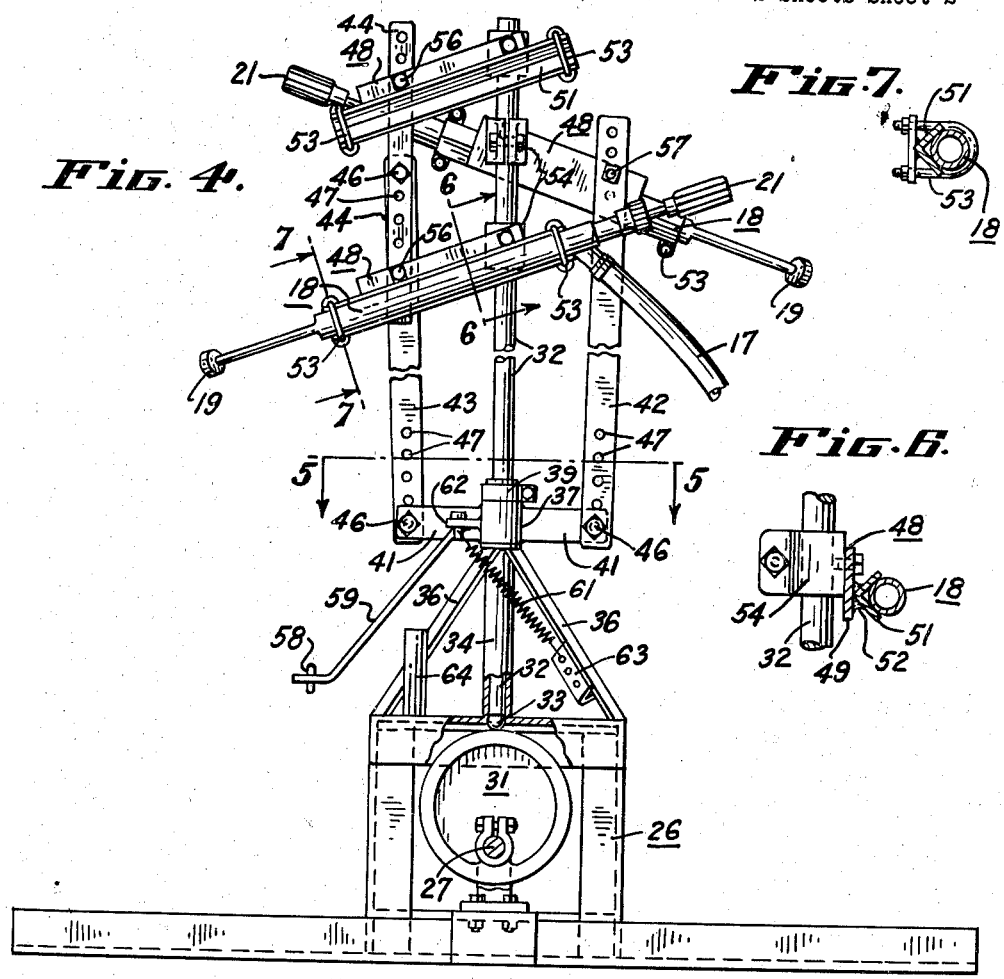
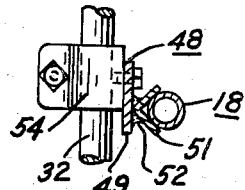
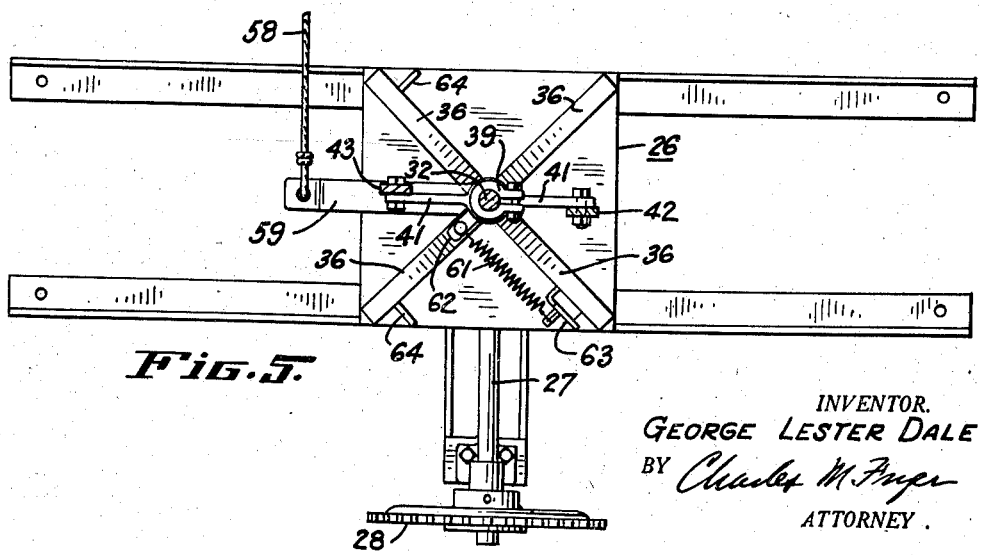
INVENTOR.
GEORGE LESTER DALE
BY Charles M. Fryer
ATTORNEY.

Patented Nov. 28, 1944

2,363,776

UNITED STATES PATENT OFFICE 2,363,776

SPRAYING APPARATUS

George Lester Dale, Santa Clara County, Calif., assignor of one-third to Losse Ranch, Santa Clara County, Calif., a partnership Application March 30, 1942, Serial No. 436,788

3 Claims. (Cl. 299—37)

My invention relates to spraying apparatus, and more particularly to mobile apparatus for spraying the foliage of trees in orchards or the like.

My invention is designed to reduce the expense of spraying of the type described, as well as to provide efficacious spraying, and has as its objects, among others, the provision of improved spraying apparatus in which a spray device or gun is automatically moved to cover a relatively wide area; which is self-propelled or mobile, but requires only one operator for controlling propulsion of the apparatus and the spraying; and is economical and simple in construction. Other objects of my invention will become apparent from a perusal of the following description thereof.

Referring to the drawings:

Fig. 1 is a fragmentary side elevation of the apparatus of my invention; only the rear portion of a tractor being shown in the view.

Fig. 2 is a fragmentary side elevation of a supporting framework forming part of the apparatus of my invention, and illustrating driving mechanism for moving such spray device.

Fig. 3 is a vertical sectional elevation of a portion of the structure shown in Fig. 2, illustrating details of construction.

Fig. 4 is an enlarged end elevational view, with parts shown in section and other parts omitted from the view to illustrate more clearly the construction, of bracket means for supporting the spray device; such bracket means being moved to a position different from that appearing in Fig. 1.

Fig. 5 is a sectional plan view taken in a plane indicated by line 5—5 in Fig. 4.

Fig. 6 is a section taken in a plane indicated by line 6—6 in Fig. 4.

Fig. 7 is a section taken in a plane indicated by line 7—7 in Fig. 4.

I have illustrated my spraying apparatus in association with a tractor which provides the source of power for propelling the apparatus, and for adjusting and operating a spray device forming part of the apparatus. It is to be understood, however, that such spraying apparatus can form a part of a complete mobile unit, if so desired. In the form of the invention illustrated, spray tank 2, adapted to contain any suitable spraying fluid, is mounted on a drawn vehicle 3, adapted for detachable connection with tractor 4 by attachment to draw-bar 6 of the tractor; such tractor having the usual operator's station 7. For stirring the spraying fluid in tank 2, the tank is provided with mixing paddles 8 mounted on a shaft 9 which is journalled for rotation in the tank adjacent the bottom thereof and is universally connected at 11 to the customary power take-off shaft 12 of the tractor. Adjacent the rear end of shaft 9 and within tank 2 is any suitable pumping means 13 driven by the shaft, to supply spraying fluid from the tank, through piping 14 having valve 16 for controlling flow of fluid and which is connected to flexible tubing 17.

In a form of apparatus heretofore employed, it was usual to utilize a flexible tube 17 and a spray device 18 connected to such tube; the spray device being of any conventional form, usually designated a "gun," having discharge nozzle 19 and adjustable valve 21 for controlling the fineness of the spray. An operator, standing on platform 22 secured to the rear of drawn vehicle 3 and having uprights 23 connected to side rails 24, would manually manipulate the single gun to direct the spray against the tree foliage as tractor 4 propelled the entire apparatus. The apparatus of my invention eliminates the necessity of the additional operator, as was previously related, and also enables a plurality of spray devices to be utilized, thus providing for directing of the spraying fluid over a greater area and for more efficacious spraying.

Mounted on the top of tank 2 is a framework 26 having journalled therein driving shaft 27, which has secured thereto adjacent one end thereof, sprocket 28 driven from shaft 9 by a chain and sprocket drive 29. Adjacent its opposite end, shaft 27 has secured thereto an eccentric cam 31, which upon driving of shaft 27 imparts reciprocating movement to an upright shaft 32, which forms part of the driving and supporting means for spray devices in my apparatus, as will be more fully explained hereinafter, and which has a ball portion 33 at its lower end engaging cam 31 to enable the shaft to turn freely as it is moved back and forth. Shaft 32 is also journalled for turning movement or rotation in a fixed sleeve 34 in framework 26; the sleeve being braced by inclined members 36 forming part of such framework. Thus, it is seen that during reciprocatory movement of shaft 32 by the drivable cam 31, it can be simultaneously turned in sleeve 34.

Also forming part of the supporting means for the spray devices, is a bracket structure comprising sleeve 37 journalled for turning movement or rotation about sleeve 34 and consequently about the axis of shaft 32. Such sleeve 37 rests on a shoulder 38 fixed to sleeve 34 and is held against movement axially of shaft 32 by a split collar 39 clamped to sleeve 34. Extending laterally from opposite sides of sleeve 37 is a pair of arms 41, turnable with sleeve 37 about the axis of shaft 32. To the end of one of such arms 41 is pivotally connected upright arm 42 extending in the same general direction as shaft 32; and to the end of the opposite arm 41 is pivotally connected another upright arm 43 also extending in the same general direction as shaft 32, and which in turn is pivotally connected to another upright arm 44 intermediate the ends thereof.

The pivotal connections among the various arms 41, 42, 43 and 44 are by means of bolts 46, which pass loosely through suitable apertures 47 in the connected parts. A plurality of such apertures 47 is provided in arms 42, 43 and 44 to provide for adjustment of the pivotal connections. Because of connection of arms 42, 43 and 44 to arms 41, they can turn with arms 41; and at the same time the pivotal connections permit independent movement of arms 42, 43 and 44 in upright planes.

Each of spray devices 18 is mounted on a supporting bracket 48 pivotally mounted on shaft 32 and on an associated one of arms 42 or 44; each bracket comprising a plate 49 and an angle 51 secured to such plate by any suitable means, such as welding 52. The spray device rests in angle 51 and is clamped in position by means of clamps 53. One end of each plate 49 is pivotally connected to a split collar 54 secured to shaft 32 by clamping, and which is adjustable on the shaft; and the two left-hand plates 49, appearing in Fig. 4, are pivotally connected at 56 to the ends of arm 44, while the right-hand plate 49, appearing in Fig. 4, is pivotally connected at 57 to the upper end of arm 42. Such pivotal connections 56 and 57 are by means of pins passing loosely through apertures in arms 42 and 44, and plates 49; and a plurality of such apertures is provided in the arms to enable adjustment of the pivotal connections.

The brackets 48 for the left-hand guns, appearing in Fig. 4, are substantially parallel, which arrangement cooperates with the described pivotal connections to enable reciprocation of shaft 32 to cause the spray guns to be freely continuously changed in elevation as the apparatus moves along and spraying occurs. Hence, as the apparatus is propelled in one direction in the space between adjacent rows of trees, the foliage along one side of the apparatus will be effectively covered vertically by the spray from a plurality of spray guns. The single spray gun opposite the plurality of guns will provide a preliminary spraying of the foliage at the opposite side of the apparatus. When the apparatus is turned around and driven in an opposite direction through the same space, the plurality of guns will cover the side of the trees preliminarily sprayed by the single gun and vice versa, thus insuring complete coverage.

As was previously mentioned, shaft 32 can turn in sleeve 34, and sleeve 37 and the associated spray gun bracket means can turn about sleeve 34. Such arrangement enables lateral adjustment of spraying devices 18 while they are continuously changed in elevation by power reciprocation of shaft 32. The lateral adjustment is preferably effected manually by means of a cord 58 readily accessible to the operator at operator's station 7 of the tractor, and which is connected to downwardly inclined arm 59 fixedly secured to turnable sleeve 37. Resilient means, in the form of a spring 61, is connected between a lug 62 secured to sleeve 37, and bracket 63 secured to one of inclined members 38.

Spring 61 urges the entire bracket structure for the guns rearwardly; the rearmost position being determined by engagement of arm 59 against limit stop 64 secured to framework 26. When cord 58 is pulled forwardly by the operator of the tractor, the spray from the guns will be adjusted laterally; the rearward movement of the guns being effected by spring 61 when the operator releases cord 58.

From the preceding description, it is seen that as the machine is propelled along a row of trees, the spray guns will be continuously changed in elevation to effectively cover all the foliage. In this connection, the angle of inclination of such guns can be adjusted beforehand on their supporting means to insure that the spray from the guns will reach the tops of trees of varying height. The lateral adjustment of the guns by means of cord 58 will insure that all the foliage on one side of a row of trees will be sprayed; and the operator can readily make such adjustment without interfering with his operation of the tractor.

I claim:
1. Orchard spraying apparatus comprising a vehicle adapted to be attached to a tractor having thereon a station for the tractor operator, a drawbar and a power take-off, said vehicle having thereon means adapted to be connected to said drawbar, a tank, a spray device, means mounting said spray device for bodily movement over a substantially fixed path relative to said vehicle and for adjustment in another path, connecting means between said tank and said spray device, pump means to supply contents of said tank through said connecting means to said spray device, means to move said spray device over said substantially fixed path to increase thoroughness of spraying, means to connect said moving means to said power take-off, and means adapted to be extended to a point within reach of the tractor operator at said station to effect said adjustment of said spray device.

2. Orchard spraying apparatus comprising a vehicle adapted to be attached to a tractor having thereon a station for the vehicle operator, a drawbar and a power take-off, said vehicle having thereon means adapted to be connected to said drawbar, a tank, means to stir the contents of said tank, a spray device, means mounting said spray device for bodily movement over a substantially fixed path relative to said vehicle and for adjustment in another path, connecting means between said tank and said spray device, pump means in said tank to supply contents of said tank to said spray device through said connecting means, means to move said spray device over said substantially fixed path to increase thoroughness of spraying, means to drive said moving, stirring and pump means from said power take-off, and means adapted to be extended to a point within reach of the tractor operator at said station to effect said adjustment of said spray device.

3. Orchard spraying apparatus for controlled spraying whether said apparatus be moving or stationary, comprising a vehicle adapted to be attached to a tractor having a station for the driver thereof, a drawbar and a power take-off; a tank on said vehicle; a shaft passing into said tank; means on said vehicle adapted to be connected to said drawbar; means to connect said shaft to said power take-off; a spray gun on said vehicle; a support having a horizontal pivot; means to tilt said gun back and forth in a vertical plane about said pivot; means to operate said tilting means from said shaft; means comprising an arm to rotate said support about a vertical axis while said gun is vertically stationary or moving; and means connected to said arm and being adapted to be extended to a point within reach of the tractor operator at said station to effect rotation of said arm and said support.

GEORGE LESTER DALE.